United States Patent
Thurston et al.

(10) Patent No.: US 7,451,676 B2
(45) Date of Patent: Nov. 18, 2008

(54) APPARATUS AND METHODS FOR DIVIDING MEDICINAL TABLETS AND FOR PACKAGING AND DISTRIBUTING TABLET PORTIONS

(75) Inventors: John Edward Thurston, Worland, WY (US); Jason Alan Lilly, Spring Valley, CA (US)

(73) Assignee: Precisionsmeds, Worland, WY (US)

( * ) Notice: Subject to any disclaimer, the term of this patent is extended or adjusted under 35 U.S.C. 154(b) by 262 days.

(21) Appl. No.: 10/894,666

(22) Filed: Jul. 20, 2004

(65) Prior Publication Data

US 2006/0016157 A1    Jan. 26, 2006

(51) Int. Cl.
   *B26D 1/01* (2006.01)
   *B26D 3/00* (2006.01)
(52) U.S. Cl. .................. 83/409.1; 83/409; 83/422; 83/425; 83/425.3; 83/932
(58) Field of Classification Search .......... 83/409, 83/409.1, 422, 425, 425.2, 425.3, 425.4, 83/431, 435.11, 435.21, 435.22, 435.23, 83/435.25, 435.26, 437.2, 508.3, 932
   See application file for complete search history.

(56) References Cited

U.S. PATENT DOCUMENTS

| | | | | |
|---|---|---|---|---|
| 159,999 A * | 2/1875 | Bellows | ...................... | 83/102.1 |
| 335,319 A * | 2/1886 | Slocum | ...................... | 83/422 |
| 1,403,254 A * | 1/1922 | Knott et al. | ...................... | 79/15 |
| 1,418,511 A * | 6/1922 | Ayala | ...................... | 83/167 |
| 1,761,984 A * | 6/1930 | Frick | ...................... | 83/409 |
| 1,925,143 A * | 9/1933 | Hartman | ...................... | 83/155 |
| 2,068,619 A | 1/1937 | Bailey | ...................... | 425/353 |
| 2,289,015 A * | 7/1942 | Jackson | ...................... | 99/636 |
| 3,175,521 A | 3/1965 | Hershberg | ...................... | 425/347 |
| 3,677,673 A | 7/1972 | Shapiro | ...................... | 425/78 |
| 3,722,339 A * | 3/1973 | Boyer | ...................... | 83/873 |
| 3,828,635 A * | 8/1974 | Smith | ...................... | 83/102.1 |
| 4,697,344 A | 10/1987 | Leopoldi | ...................... | 30/124 |
| 4,960,021 A * | 10/1990 | Carney et al. | ...................... | 83/120 |
| 5,316,061 A * | 5/1994 | Lee | ...................... | 144/218 |
| 5,603,880 A | 2/1997 | Kato et al. | ...................... | 264/112 |
| 6,042,864 A * | 3/2000 | Bastasch et al. | ...................... | 426/497 |
| 6,050,064 A | 4/2000 | Yuyama et al. | ...................... | 53/514 |
| 6,244,146 B1 | 6/2001 | Arthur et al. | ...................... | 83/23 |
| 6,488,192 B1 | 12/2002 | Yuyama et al. | ...................... | 225/96.5 |
| 6,527,155 B2 | 3/2003 | Buckley et al. | ...................... | 225/1 |
| 2002/0170398 A1* | 11/2002 | Verhaeghe | ...................... | 83/13 |

(Continued)

FOREIGN PATENT DOCUMENTS

DE    19737747 A1    2/1998

(Continued)

*Primary Examiner*—Boyer D. Ashley
*Assistant Examiner*—Edward Landrum
(74) *Attorney, Agent, or Firm*—Woodcock Washburn LLP

(57) ABSTRACT

Apparatus for dividing medicinal tablets is disclosed. Such apparatus may include a plurality of tablet dividing members disposed along a common axis, a tablet retention mechanism adapted to hold a plurality of oral solid medicinal tablets, and a controller that causes the tablet retention mechanism to move relative to the tablet dividing members. Each medicinal tablet may have a respective initial dosage of an active constituent. The tablet dividing members may be disposed relative to one another along the common axis to divide each of the medicinal tablets into a respective plurality of tablet portions. The partial dosages of all the tablet portions may be equal.

3 Claims, 10 Drawing Sheets

U.S. PATENT DOCUMENTS

| | | | |
|---|---|---|---|
| 2003/0005800 A1 | 1/2003 | Czarnek et al. | 83/24 |
| 2003/0034373 A1 | 2/2003 | Yuyama et al. | 225/96.5 |

FOREIGN PATENT DOCUMENTS

| | | |
|---|---|---|
| JP | 07-24786 | 1/1995 |
| JP | 11-226088 | 8/1999 |
| JP | 11-226089 | 8/1999 |
| JP | 2002-325821 | 11/2002 |
| JP | 2002-325822 | 11/2002 |
| JP | 2002-325824 | 11/2002 |

* cited by examiner

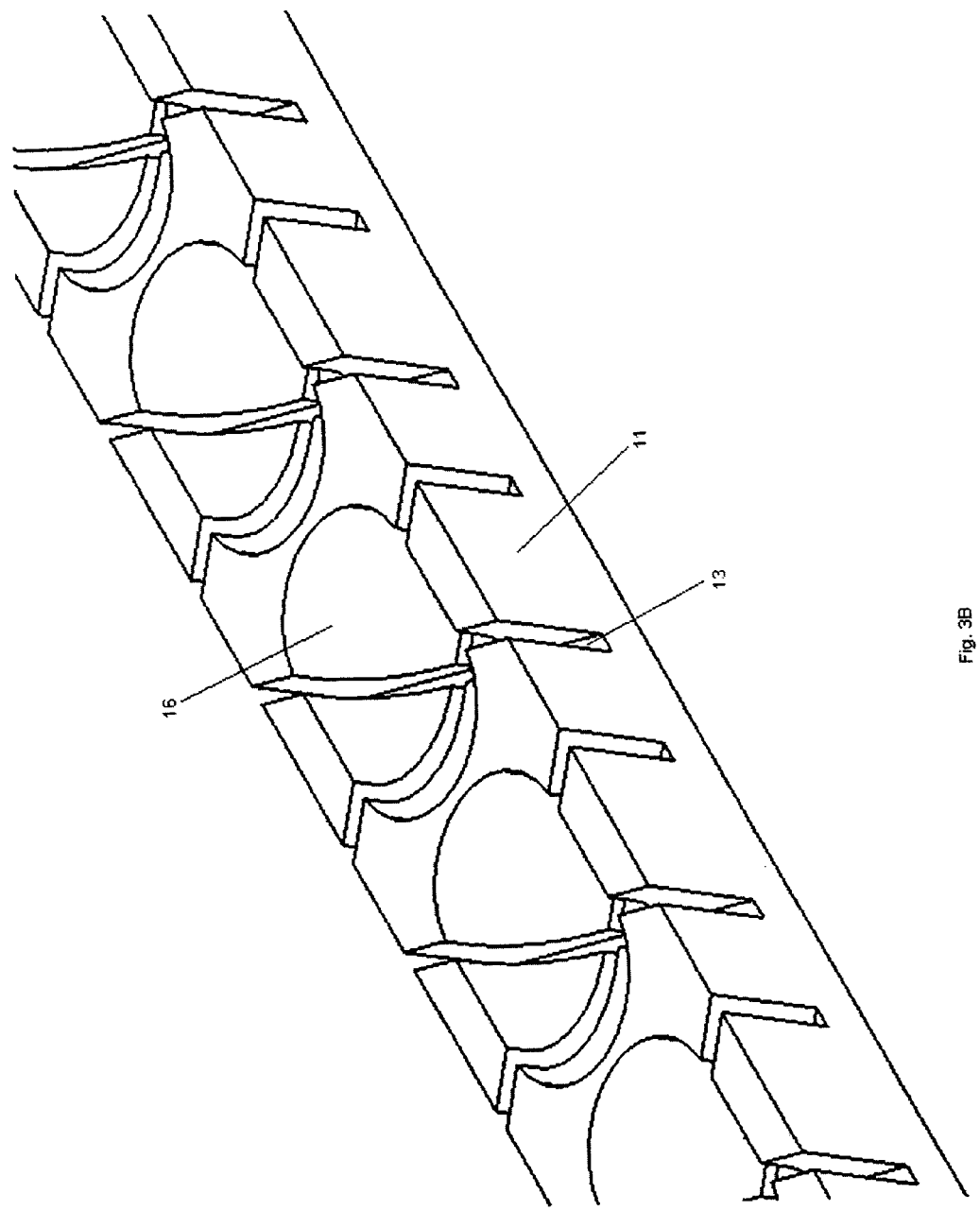

APPARATUS AND METHODS FOR DIVIDING MEDICINAL TABLETS AND FOR PACKAGING AND DISTRIBUTING TABLET PORTIONS

FIELD OF THE INVENTION

Generally, the invention relates to apparatus and methods for dividing medicinal tablets into tablet portions, and to methods for packaging and distributing such tablet portions in a controlled, reliable manner.

BACKGROUND OF THE INVENTION

Many types of medications, vitamins, supplements, and other compounds are intended to be taken orally and are provided in the form of solid tablets. Such tablets may be provided with a predetermined concentration (i.e., dosage) of one or more active constituents and may be commercially available in many different tablet shapes and sizes. FIG. 9 depicts representative types of commercially-available tablets. As illustrated in FIG. 9, these representative tablet shapes include capsules 11A, 11B, 11C, ovals 11D, 11M, 11N, ellipses 11E, 11O, 11P, balls 11F, 11G, 11H, disks 11I, triangles 11J, squares 11K, and multi-angle shapes, such as 11L.

People sometimes require a lower dosage of medication or other active constituent than that provided in a whole tablet. The term "lower dosage," as that term is used herein, refers to a dosage that includes less than the full amount of active constituent (i.e., full dosage) provided in a whole tablet. For example, it may be inappropriate for a child or small adult to take an entire tablet containing a full medication dosage because the concentration of the medication or other active constituent may exceed a safe level for a person of that age or size. Unfortunately, many types of tablet-form medications are commercially available only in full dosage concentrations. Tablet splitting offers an opportunity to provide more appropriate dosage concentrations.

Another benefit of dividing oral solid tablets into smaller portions is that the reduced size of the tablet may make it easier for a person to ingest the tablet. For instance, certain tablets are large and may be provided in shapes that are difficult for children and small adults to swallow. Reducing the size of the tablet may make swallowing the tablet easier.

Tablet splitting is gaining popularity and wide acceptance because it offers an opportunity to contain the cost of healthcare. This opportunity exists because the pharmaceutical manufacturers provide medication in the tablet form in a variety of dosage strengths to help titrate the correct dose to each patient. Tablets of different strengths of the same medication have little price variance. For example, it is common for one tablet with a dosage of 20 mg of a medicine to cost the same as one tablet with a dosage of 40 mg or even 80 mg of the same medicine. By prescribing one-half, one-quarter, one-eighth, etc., of a tablet, significant savings can be realized. In addition, tablet splitting may be used to obtain doses that are not currently available.

Physicians, pharmacists, patients, health maintenance organizations, pharmacy benefit managers, and the like frequently request tablet splitting. As no standard exists, pill splitting quality varies greatly. The task of monitoring quality is often too expensive, complicated, and laborious for most institutions and individuals. Additionally, quality standards are not readily available for split tablets.

Many prior art devices designed to divide tablets are generally quite basic, provide limited accuracy, and are labor intensive. One of the most common ways of dividing tablets is with a simple hand-held knife or razor blade. The tablet is simply clamped between the blade and a hard surface until the tablet is cut or breaks. Many pharmacies and institutional facilities use this simple technique for cutting pills into smaller portions. This manual dividing technique, however, is slow and labor-intensive. Manual dividing of tablets may also be inaccurate and may result in incorrect dosages. Manual dividing may crush the tablet rather than divide cleanly through the tablet thereby wasting potentially costly medication.

Problems associated with many tablet dividing devices include tablet shattering, inaccuracy, and significant loss of product during the dividing process. Studies have shown that off-the-shelf tablet dividers fail to meet expectations for content uniformity. Given the public desire and expectations for high product standards, as demonstrated in the standards for whole tablet content uniformity, and the studies mentioned, as well as the vast promotion for tablet splitting, a compromise on public standards exists. That is, the standards for whole tablets are exacting and aimed at ensuring that a tablet has an accurate and balanced concentration of the medicinal titrate. Consuming an inaccurately divided tablet portion obviates the need and purpose of these exacting, whole-tablet standards.

As can be readily appreciated, the above-mentioned problems associated with the dividing of tablets are amplified in large-scale pharmacies, such as those found in institutional settings like hospitals or skilled nursing facilities. Such institutional settings are ideal candidates for dispensing tablets having intermediate dosages of medication because of the needs of the consumer. Under present practice, the pharmacy that provides medication to these institutions usually takes the responsibility for dividing the conventional tablets into half-tablet forms, each half-tablet including an inexact intermediate (e.g., half) dosage. Manual dividing of the tablets can be extremely complicated because a number of different tablet-form medications may need to be divided on a routine basis in large quantities in order to fulfill the prescription requirements for these large facilities. The logistics of dividing these tablets can be formidable.

Another disadvantage of manual tablet-dividing, particularly in pharmacies dispensing many different types of tablets, is that the pharmacist may become exposed to medication particles potentially causing injury to the pharmacist. In addition, the knife blade or hard surface may become coated with residue from the divided or crushed tablets potentially contaminating subsequently-divided tablets using the same equipment. Any cross-contamination could potentially result in injury to the patients.

It would be desirable, therefore, to have a dividing apparatus that alleviates the labor-intensive nature of the dividing operation. It would further be desirable to have such an apparatus divide tablets into more than two tablet portions to meet dosage, size, or economic needs. It would also be desirable to divide a tablet into a plurality of tablet portions in one pass, rather than performing multiple sequential dividing operations to obtain a plurality of tablet portions. Additionally, it would be desirable to divide a previously divided tablet portion into still smaller tablet portions. Also, it would be desirable to have the resultant tablet portions with a smooth, finished edge similar to the edges of a whole tablet. Rough edges tend to cause the tablet to be prone to disintegration when the tablet rubs against objects such as other tablets or the side of a tablet container.

SUMMARY OF THE INVENTION

The invention provides a tablet dividing apparatus for use in accurately dividing a plurality of tablets and other small objects into tablet portions quickly and accurately. Apparatus according to the invention may leave the divided tablet portions with a fine, smooth edge to reduce the risk of disintegration of the portion as it rubs against other objects such as other tablets or the side of a tablet container. The invention provides apparatus and methods for dividing tablets into exact dosage amounts depending on the needs of the consumer and for dividing previously divided tablet portions into still smaller portions. A plurality of tablets may be divided at one time, and each of these tablets may be divided into tablet portions with just one operation of a tablet dividing mechanism.

Generally, the invention provides a tablet dividing apparatus that can divide a plurality of tablets in one operation. The tablet dividing apparatus may include a tablet retention mechanism and a tablet dividing mechanism. In one embodiment, the dividing apparatus can divide each of a plurality of tablets into a respective plurality of divided tablet portions in a single pass. In another embodiment, the dividing apparatus can divide each of one or more tablets into a respective plurality of three or more tablet portions in a single pass.

The tablet retention mechanism may include a plurality of tablet mold cavities that support the tablets on the bottom and sides, and maintain alignment of the tablet before, during, and after the tablet dividing operation. Additionally, the tablet retention mechanism may include a plurality of forks that hold each tablet in place from the top, while allowing the tablets to be divided into two or more tablet portions without interfering with the tablet dividing mechanism. In one example embodiment of the invention, a tablet tray mold may be adapted to provide for dividing the tablets with a tablet dividing mechanism configured to divide the tablets in both directions perpendicular and parallel to the tablet retention mechanism. This configuration allows for further dividing a previously divided tablet portion. In another example embodiment of the invention, tablet tray mold cavities rotate to allow the dividing of the tablets in more than one direction.

The tablet dividing mechanism may be configured such that when the tablet retention mechanism is moved towards and into the dividing device, each tablet is divided into a plurality of tablet portions of either equal or differing sizes. The tablet dividing mechanism may be operated by an electric motor or similar device. In one example embodiment of the invention, a plurality of tablets may be divided into two or more tablet portions with just one dividing operation. In another example embodiment, the tablet dividing mechanism may divide a plurality of tablets in directions both perpendicular and parallel to the tablet retention mechanism. Additionally, the tablet dividing mechanism may be configured to allow for the dividing of tablets at any angle in relation to the tablet retention mechanism.

In an example embodiment of the invention, the tablet dividing apparatus is associated with a controller (e.g., a microprocessor). The controller may control the movement of the tablet retention mechanism toward and away from the tablet dividing mechanism, adjust the speed of the tablet dividing mechanism, and control any other process in the dividing operation and any other device associated with the tablet dividing mechanism or tablet retention mechanism.

In a further example embodiment of the invention, the tablet dividing device may be associated with a vacuum apparatus for removing divided tablet particulates (e.g., dust) from the tablet dividing mechanism. Such a vacuum apparatus may include a fan or other air-flow apparatus positioned to move particulate-containing air away from the tablet dividing mechanism.

Additionally, an example embodiment of the invention may include an ejector associated with the tablet dividing device that removes divided tablet portions from the device. The ejector may facilitate the combining of similarly shaped divided tablet portions, for packing or marketing, for example. That is, the ejector may eject and separate the end pieces of a divided tablet into one container while ejecting and separating the center pieces of the divided tablet into a different container. This operation may be desirable because, though the tablet portions may be of equal volume (and, therefore, of equal dosage), the disparate shapes of the resulting divided tablet portions may be perceived as being of different volumes. Packaging the similarly shaped tablet portions together mitigates this confusion.

Apparatus according to the invention may provide for dividing a plurality of tablets into two or more tablet portions quickly and accurately while leaving the divided tablet portions with a fine, smooth edge. Such a device, therefore, may provide large healthcare organizations, hospitals, pharmacies, and consumers with divided tablet portions in any desired quantity, precise dosage, and useful size without loss in the accuracy associated with whole tablets.

BRIEF DESCRIPTION OF THE DRAWINGS

FIGS. 3A and 3B depict example embodiments of a tablet tray mold according to the invention.

DETAILED DESCRIPTION OF ILLUSTRATIVE EMBODIMENTS

Figure 1:
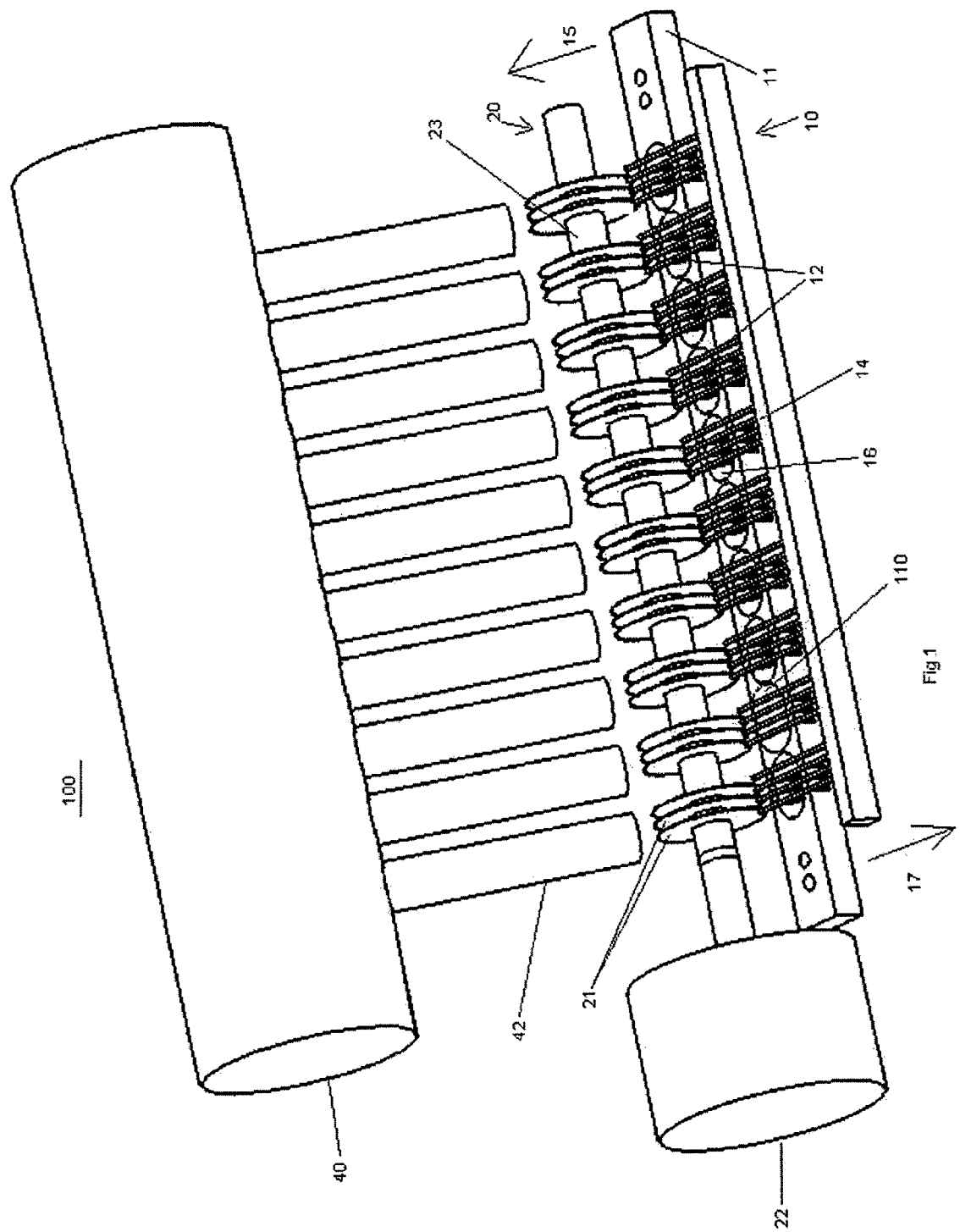
FIG. 1 depicts an example embodiment of a tablet dividing device according to the invention.

FIG. 1 depicts an example embodiment of a tablet dividing apparatus 100 according to the invention that may be used to divide each of one or more solid medicinal tablets into a respective plurality of two or more tablet portions. As shown, the tablet dividing apparatus 100 may be used to divide each of ten tablets 110 into four tablet portions.

The tablet dividing apparatus 100 may include a tablet retention mechanism 10 and a tablet dividing mechanism 20. The tablet retention mechanism 10 may be adapted to retain each of a plurality of tablets 110. Each tablet 110 may be retained, or held in place, in a respective mold cavity 16 of a tablet tray mold 11. A plurality of forks 12 may be provided for retaining the tablets 110 in the cavities 16. The forks 12, in combination with the cavities 16, retain the tablets 10 in all directions within the tablet tray mold 11 throughout the dividing operation. Though FIG. 1 discloses a mold 11 having a single linear array of cavities 16, it should be understood that a tablet tray mold according to the invention may contain any number of cavities, arranged in any desired array. The tablet tray mold 11 may be made of plastic, cast iron, or any other suitable material.

The mold cavities 16 support the tablet 110 on the bottom and sides and also help to maintain the alignment and prevent movement of the tablets 110 throughout the dividing operation. The mold cavities 16 may be of a concave shape that corresponds to the shape of the tablets 110. The mold cavities 16 may be constructed of the same material as the tablet tray mold. The mold 11 may be formed as a single piece. The mold cavities 16 may also be constructed of, or lined with, a pliable, silicon-based or similar material, for example, that allows for deviations in pill sizes or shapes. The mold cavities 16 may be slightly smaller than the tablets 110 they are adapted to receive, and may be resilient enough so that the cavities 16 stretch when the tablets 110 are placed into the cavities 16. Thus, the tablets 110 may fit snugly within the cavities 16 such that the cavities 16 retain the tablets 110 from moving in any of five directions (i.e., the ±x, ±y, and −z directions as shown in FIG. 2).

Figure 2:
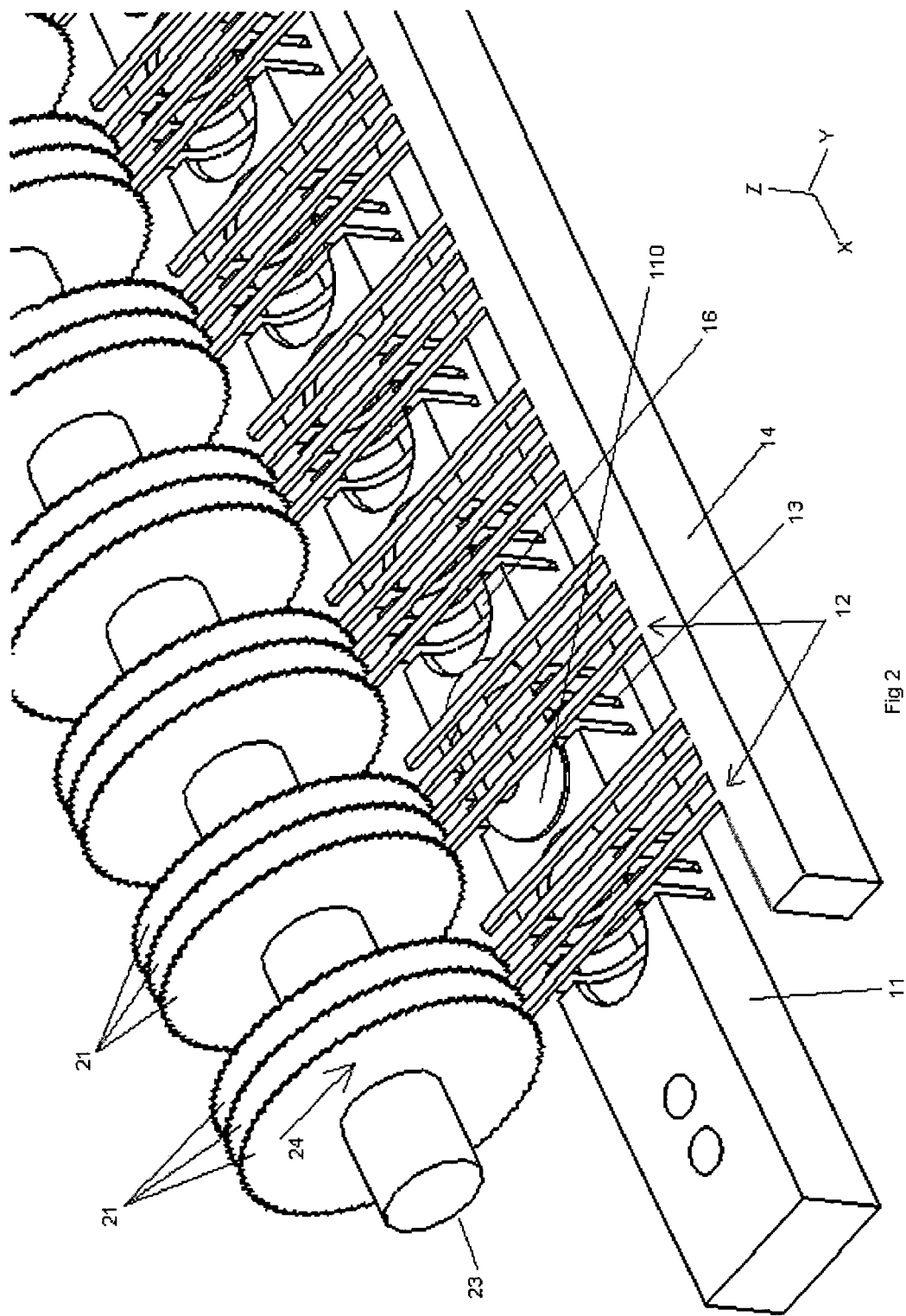
FIG. 2 provides a detailed view of a portion of a tablet dividing device according to the invention.

The forks 12 contact the top of respective tablets 110 to keep the tablets 110 from moving in the sixth direction (i.e., the +z direction as shown in FIG. 2). That is, the forks 12 keep the tablets 110 from moving up out of the cavities 16. Thus, the mold cavities 16 and the forks 12, in combination, ensure that the tablet is retained in all directions. Furthermore, it should be understood that forks are just of one many options that may be used to retain the pill in the +z direction. Other methods that may be used include, for example, a cellophane wrap like material, tape like material, solid clam shape molds, among others.

The tablet dividing mechanism 20 may include a plurality of dividing members 21 disposed to divide each of one or more tablets 110 into a respective plurality of two or more tablet portions. As shown in FIG. 1, the tablet dividing members 21 may be rotary saw blades disposed along a common spindle 23. A motor 22 may be provided to rotate the spindle 23.

Though the tablet dividing members 21 are shown as rotary saw blades, it should be understood that apparatus according to the invention may include any type of dividing member. For example, a reciprocating or band-type blade may be used. The type of dividing member may be chosen to provide as smooth an edge as possible on the resultant tablet portions, and to limit the amount of splintering and waste (e.g., pill dust) as a result of the dividing process.

The dividing members 21 may be ganged, as shown in FIG. 1, to divide each of a plurality of tablets 110 into a respective plurality of tablet portions. As shown, the dividing members are disposed along the axis of the spindle 23 as ten gangs of three dividing members each. Thus, the embodiment of the dividing mechanism 20 shown could divide up to ten tablets at a time (i.e., in a single pass of the tablet retention mechanism 10 through the tablet dividing mechanism 20), with each tablet being divided into four tablet portions, and each tablet portion having roughly the same volume. It should be understood, however, that the dividing members 21 may be arranged to divide any number of tablets into any number of tablet portions, and to divide any number of tablets into tablet portions having unequal volumes.

According to the invention, the tablet retention mechanism 10 may be movably coupled to the tablet dividing mechanism 20. For example, the tablet retention mechanism 10 may be moved toward the tablet dividing mechanism 20, in the direction indicated by arrow 15, to perform the tablet dividing operation. After the tablets are divided, the tablet retention mechanism 10 may be moved away from the tablet dividing mechanism 20, in the direction indicated by arrow 17. Alternatively, the tablet dividing mechanism 20 may be moved toward the tablet retention mechanism 10 to perform the tablet dividing operation, and, after the tablets are divided, the tablet dividing mechanism 20 may be moved away from the tablet retention mechanism 10.

In an example embodiment, the tablet retention mechanism is moved toward the tablet dividing mechanism at a first, relatively rapid rate, e.g., 1-10 inches per second, until it gets to within a predefined distance of the dividing members. After the tablet retention mechanism gets to within the predefined distance of the tablet dividing members, the rate at which the tablet retention member is moved toward the blades decreases to a second, relatively slow rate, e.g., 1-20 inches per minute as the tablets are moved through the blades and divided. After the tablets are divided, the tablet retention mechanism is pulled back through the blades at a third, relatively rapid rate, e.g., 1-10 inches per second. After the tablets are pulled away from the blades, the tablet retention mechanism may be pulled away from the tablet dividing mechanism at a fourth, relatively rapid rate, e.g., 1-10 inches per second. It should be understood that the rates may be chosen to produce desirable results for the specific type of tablets being divided.

As shown, the forks 12 may be configured and disposed to allow the passage of the dividing members 21 through the tablet 110, while retaining the tablet 110 and the resultant tablet portions within the mold 11 throughout the cutting operation. That is, each fork 12 may include a respective plurality of tines, with gaps between adjacent tines. The dividing members 21 pass between the tines during the cutting process. Each tine holds a respective tablet portion after the tablet 110 has been divided. Though FIG. 1 depicts forks 12 disposed to allow the passage of the dividing members 21 through the tablets in a direction that is perpendicular to the longitudinal axis of the tablet retention mechanism 10, the forks 12 may be disposed to allow the passage of a dividing member 21 through the tablets at any angle.

The tines may be resilient in order to conform to the shape of the particular tablet being held in the cavity. For example, if the tablet to be divided has a flat top surface, then the tines may be set at roughly the same height (as measured relative to the surface of the tablet mold). If the tablet to be divided has a rounded top surface, such as may be the case with an oval tablet, for example, then the tines of a single fork may be set at differing heights along the contour of the tablet. The configuration of the forks 12 may vary also depending on the shape of the tablet and the number, volume, and shape of the tablet portions desired.

The forks 12 may be attached individually to the tablet tray mold 11, or a plurality of forks may be attached to a separate fork manifold 14. Each fork may be attached to the mold or manifold by a respective fastener, which may be a screw, for example, or by any suitable means, such as by welding, for example. In an embodiment wherein the forks 12 and fork manifold 14 are made of the same material, such as plastic or metal, for example, the forks 12 and fork manifold may be molded or cast as a single piece. The fork manifold 14 may be fixedly coupled to the tablet tray mold 11 by any suitable means, such as by welding or through the use of fasteners. It should be understood that forks 12, fork manifold 14, and tablet tray mold 11 may retain the same relative position to each other during the dividing process.

Figure 9:
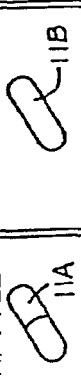
FIG. 9 provides a table of example tablet shapes.

Apparatus 100 may be configured to divide a tablet 110 into four tablet portions of equal volume (i.e., dosage). It should be understood, however, that apparatus according to the invention may be configured to divide tablets into any desired number of tablet portions, and to divide tablets into tablets portions having different volumes/dosages. Further, though apparatus 100 is depicted in FIG. 1 for use with an oblong tablet, it should be understood that apparatus according to the invention may be used to divide tablets of any shape, such as any of the tablet shapes depicted in FIG. 9.

A vacuum 40 may be used to remove tablet particulates (e.g., dust) from the dividing members 21 by blowing or sucking any tablet particulate off of the dividing blades 21 through the use of a fan. The fan may be operated by a motor and may facilitate sending the particulates out of the tablet dividing mechanism to be captured on a filter to prevent inhalation by the operator or any other person. The controller 30 may control operation of the vacuum 40. Such a vacuum may be constructed of any suitable material such as metal or plastic. As shown, the vacuum 40 may include a respective vacuum tube 42 corresponding to each gang of dividing members 21.

Figure 3A:
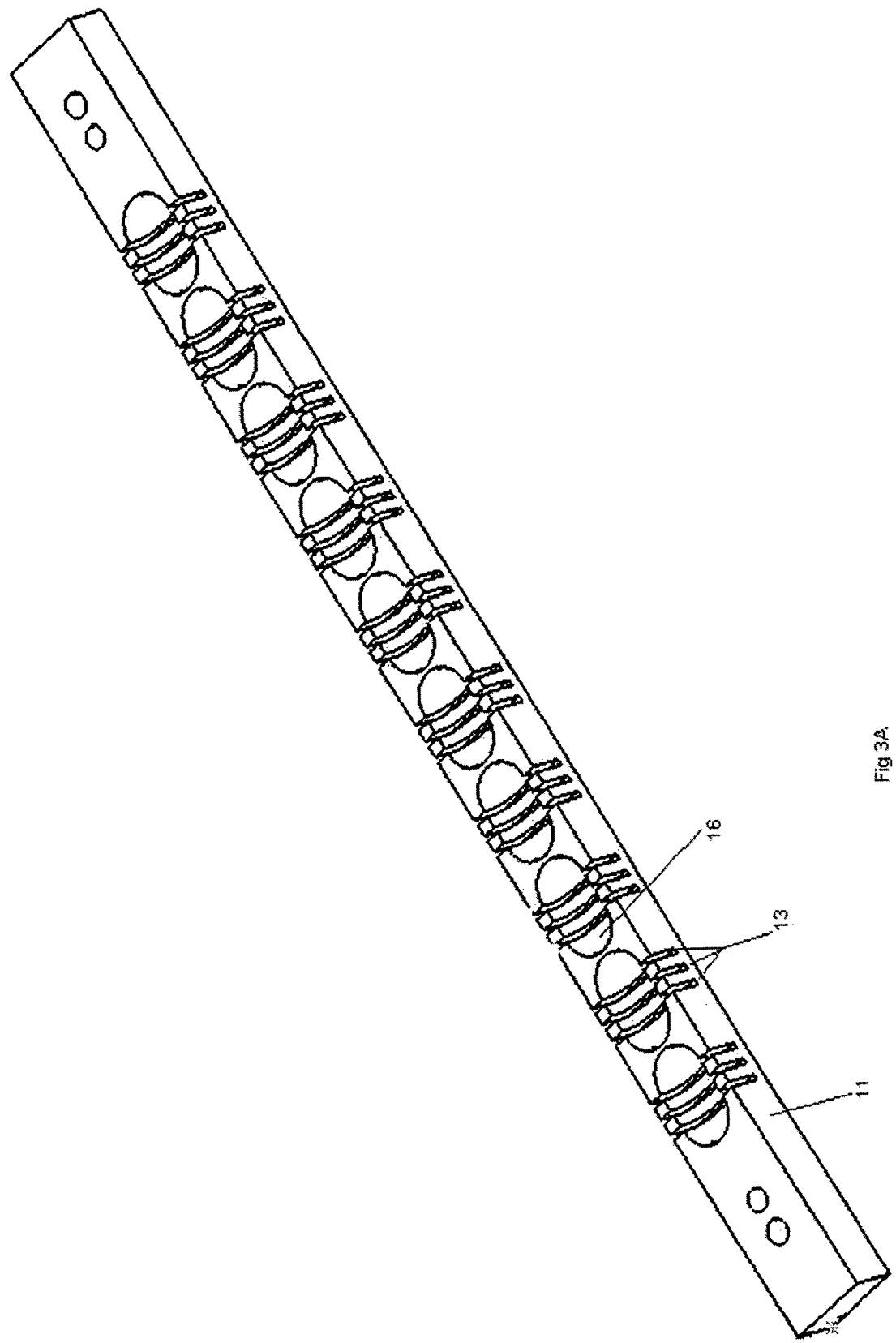

FIGS. 2, 3A, and 3B provide detailed views of a tablet tray mold 11, a fork manifold 14, forks 12, and dividing members 21 disposed to divide a plurality of tablets 110 into respective pluralities of tablet portions according to the invention. As can be seen from FIG. 2, the dividing members 21 may divide the tablets without interference from the forks 12. Also, the dividing members 21 may be disposed on the spindle 23 such that the dividing members 21 rotate in a direction, such as depicted by the direction of the arrow 24 in FIG. 2, that tends to push the tablet 110 down into the cavity 16 of the mold 11. Such a sawing technique, known as "climb milling," may be desirable as it tends to provide a cleaner cut through the tablet.

Each mold cavity 16 may include a respective plurality of grooves 13 disposed to allow for the passage of the dividing members 21 through the cavity during the dividing process. Though the grooves 13 are shown disposed to allow the passage of dividing members 21 perpendicular to the tablet tray mold 11, the grooves 13 may be disposed to allow the passage of dividing members 21 at any angle (see FIG. 3B, for example). The forks 12 may be disposed relative to the grooves 13 in a manner that allows for the unimpeded movement of the dividing members through the grooves, while the tines of the forks retain the tablets/tablet portions within the cavities throughout the dividing process.

Figure 4:
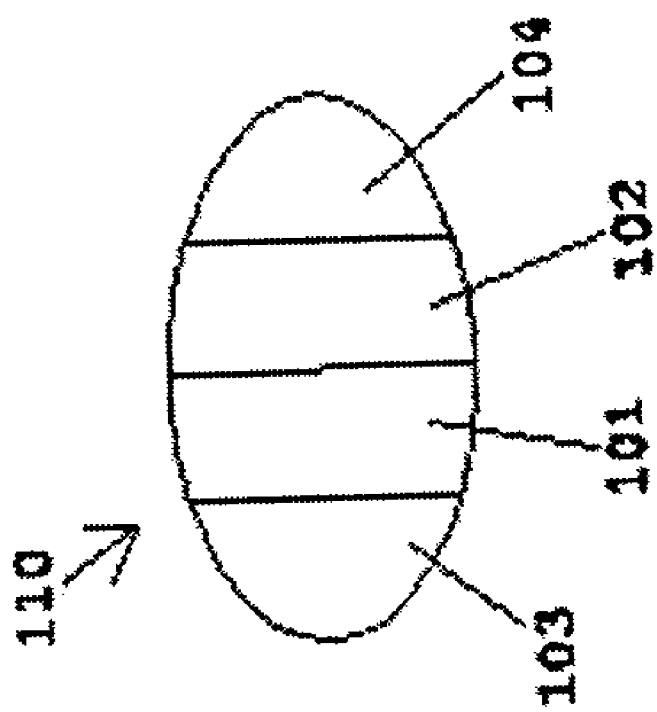
FIG. 4 depicts a tablet divided using a tablet dividing device according to the invention.

FIG. 4 discloses an example embodiment of a tablet 110 after being divided in accordance with the invention. As shown, the tablet 110 has been divided into four tablet portions 101, 102, 103, and 104. All of the tablet portions 101, 102, 103, and 104 may have roughly the same volume or weight, and may, therefore, include roughly the same dosage. Due to the shape of the tablet 110, however, end portions 103 and 104 have a shape that is different from the shape of middle portions 101 and 102.

In an embodiment wherein the dividing member is a saw blade, the blade may have a plurality of teeth disposed along, or around the perimeter of, the blade. Tooth geometry and spacing between teeth may be chosen to provide an optimal cut for a specific tablets or tablets to be divided. Other factors, such as blade thickness, blade diameter, blade composition, and blade rotation speed, for example, may also be considered in determining the appropriate type of dividing member 21 for a particular tablet 110. Proper selection of these factors may result in a highly accurate division of the tablets 110 with minimal waste, leaving the tablet portions with a fine, smooth edge. A smooth edge may prevent the tablet portion from deteriorating as it rubs against, for example, other tablet portions, tablets, or the side of a tablet container.

In an example embodiment, such a rotary blade may have a diameter of about 1.5 inches, with about 36 teeth distributed evenly around the circumference of the blade. Desirable results have been found using blades having teeth that are about the same size and shape as the teeth that would be found on a commonly available rotary blade having a 1.5 inch diameter and about 120 teeth distributed evenly around the circumference of the blade. It should be understood, however, that tooth geometry (i.e., size and shape) may be selected to produce desirable results, and is expected to depend on blade rotation speed.

The blade may be formed of stainless steel or of any other material from which such blades are typically made. Good results have been found using a carbide blade with 36 teeth.

Rotation speed maybe chosen to produce optimum tablet cutting results. Desirable results have been found using a 1.5 inch diameter rotary blade rotated at a rotation speed in the range of about 500-2000 rpm. It is expected that, with larger diameter blades, slower rotation speeds will be required to produce desirable results. It is also expected that, with very straight blades, desirable results may be achieved at faster rotation speeds. For example, rotation rates of up to 2000 rpm have produced desirable results using very straight blades.

Figure 5:
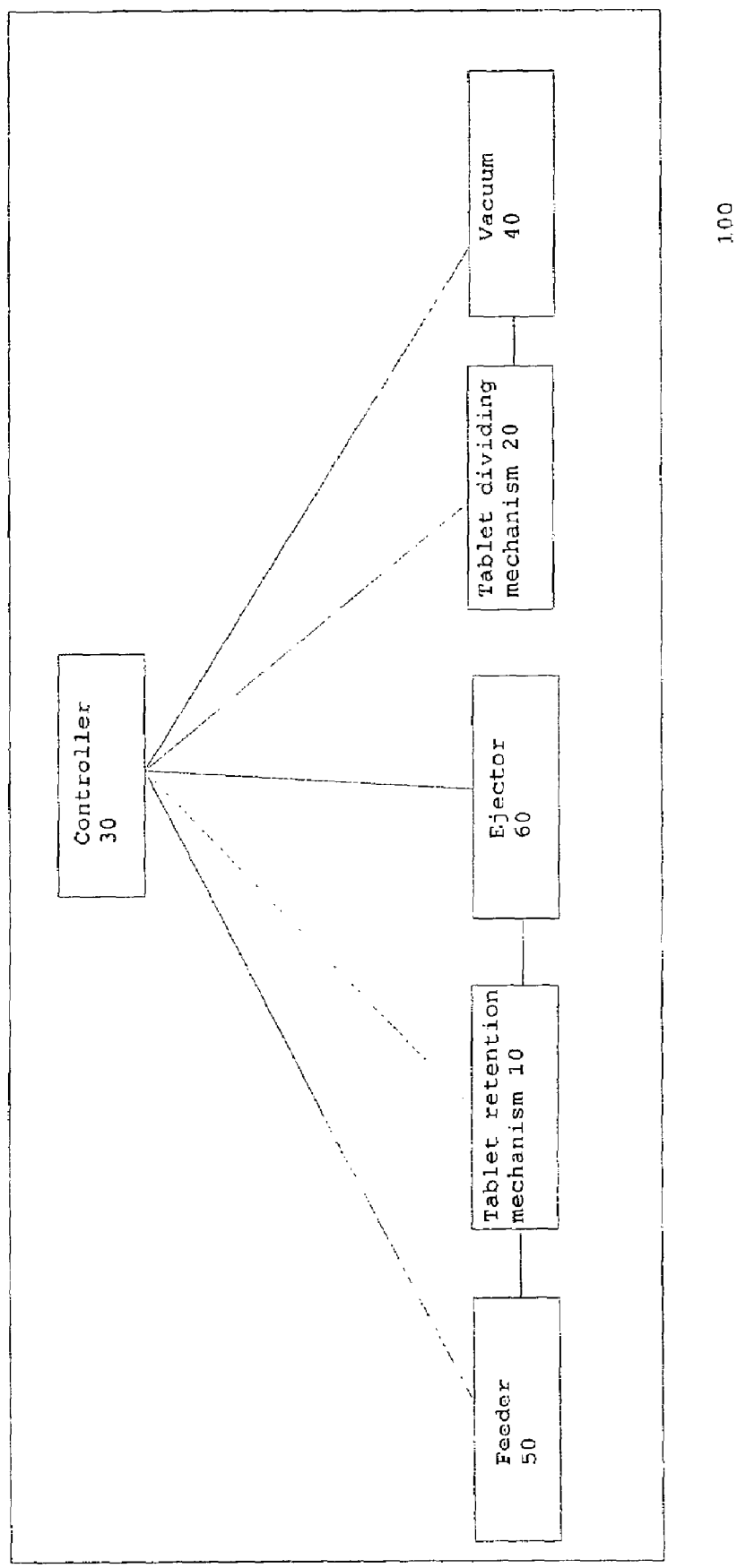
FIG. 5 is a block diagram of an example embodiment of a tablet dividing device according to the invention.

FIG. 5 is a block diagram of an example embodiment of a tablet dividing device according to the invention. As shown, a controller 30 may control the operation of the tablet retention mechanism 10, the tablet dividing mechanism 20, and the vacuum 40 described above, as well as the operation of any other component of the tablet dividing apparatus 100, such as a feeder 50 and an ejector 60, for example.

The controller 30 may be a microprocessor, for example, that controls the operation of the tablet dividing device 100. The controller may generate command signals to the operative components based on timing, the type of tablet, the nature of the dividing operation, and other appropriate input information. The controller 30 may control the rate at which the dividing mechanism oscillates or rotates the dividing member(s), and the rate at which the tablet retention mechanism moves toward and away from the tablet dividing mechanism during the various stages of the dividing process. Additionally, the controller 30 may control the feeder 50 to place whole tablets into the mold cavities.

The tablet feeder 50 may be used for the automatic delivery and placement of tablets into the tablet retention mechanism 10. The feeding device may include a vibratory feeder bowl connected to a vibrating in-line track such that tablets placed in a vibratory feeder bowl would automatically travel through the in-line track. The tablets may then be placed into the tablet retention mechanism 10 by any suitable means, such as by a vacuum-pick-and-place unit, for example, or other such device. The tablet feeder 50 may be constructed of any suitable material such as plastic or metal.

The ejector 60 may be used for automatically removing divided tablet portions from the tablet retention mechanism 10. The ejector 60 may facilitate the collating of similarly shaped divided tablet portions for packaging or delivery. The ejector could be any suitable mechanism, such as a vacuum-pick-and-place unit, for example, or other such device. The ejector may also eject tablet portions of similar shape or dosage together for packaging.

Figure 6:
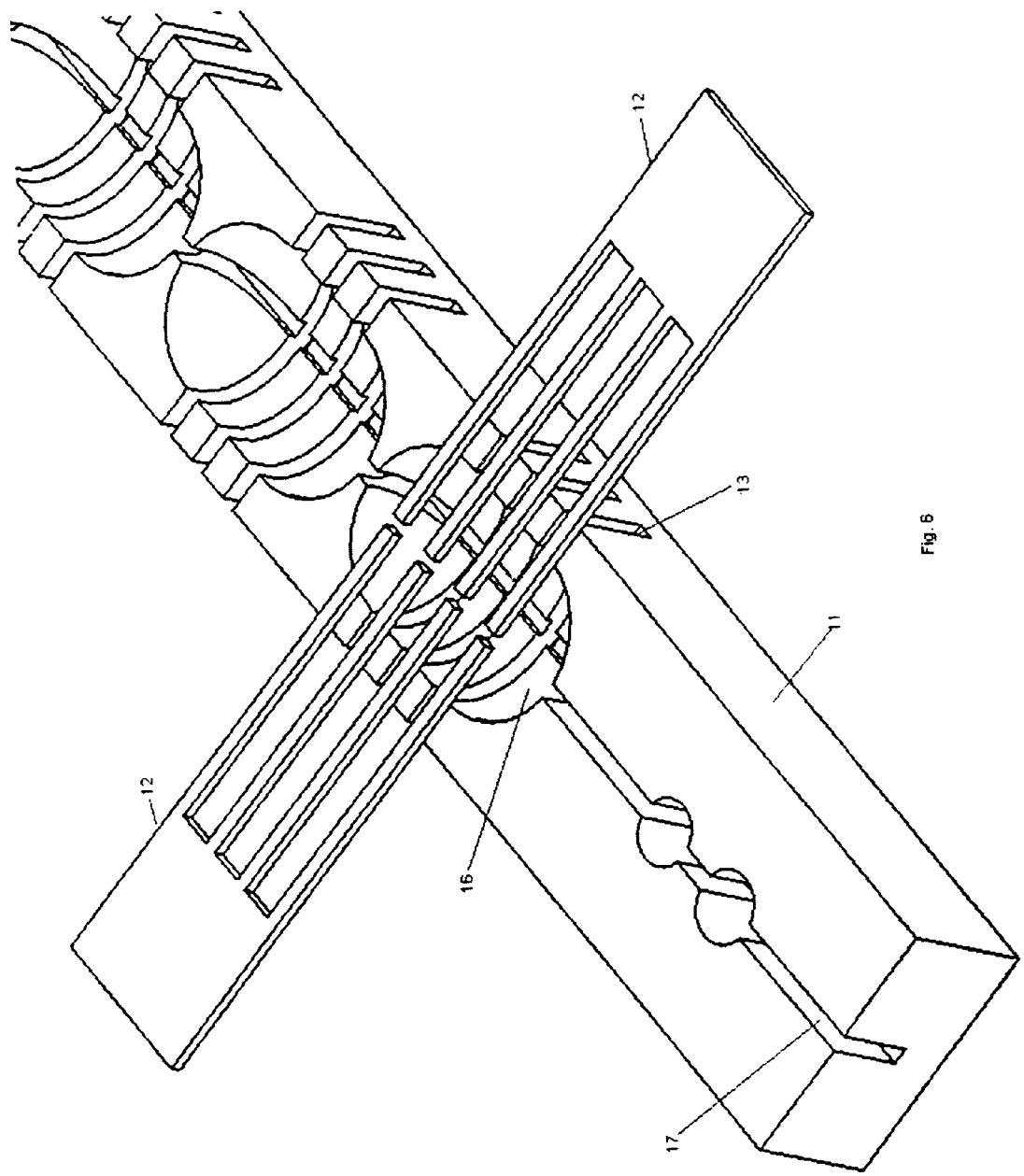
FIG. 6 depicts a partial view of an example embodiment of a tablet retention device that allows cutting in multiple directions.

FIG. 6 depicts an example embodiment of a tablet tray mold 11 for use in dividing each of one or more tablets in more than one direction. The tablet tray mold 11 may be configured to allow the passage of dividing members (not depicted) in a direction that is perpendicular to the longitudinal axis of the mold 11 as well as in a direction that is parallel to the longitudinal axis of the mold 11. In addition to the grooves 13 in mold cavities 16, which are disposed to allow the passage of dividing members perpendicular to the longitudinal axis of the tablet tray mold 11, a parallel groove 17 may be provided to allow a dividing member to further divide the tablets in a direction perpendicular to grooves 13. In this way, tablets may be divided in two passes, presenting the ability to provide tablet portions of a smaller size and dosage for economical or other reasons.

As with the grooves 13, parallel groove 17 may be disposed to allow the passage of a dividing member at any angle. A plurality of parallel grooves 17 may be provided to allow for a plurality of dividing member to divide the tablet portions. A dual set of forks 12 stabilize the tablet portions during the second dividing operation without impeding the passage of any of the dividing blades either during the parallel or perpendicular dividing processes.

Figure 7:
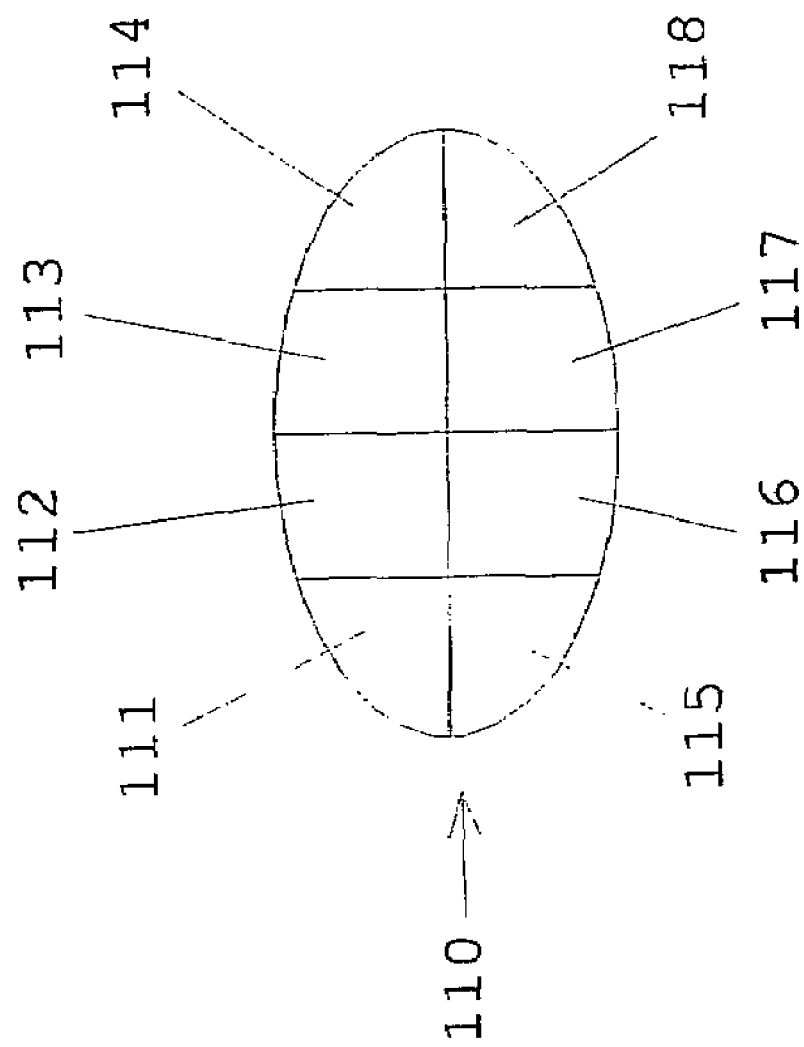
FIG. 7 depicts a tablet divided using a tablet dividing device as depicted in FIG. 6.

FIG. 7 is a perspective view of an example embodiment of a tablet 110 divided into eight tablet portions 111-118. In a first cutting operation, the gang of three blades cuts perpendicular to the longitudinal axis of the mold, which results in a plurality of tablet portions such as tablet portions 101-104 depicted in FIG. 4. Each of the tablet portions may then be divided into two smaller tablet portions by a single blade cutting along the longitudinal axis of the mold. It should be understood that the cutting operation along the longitudinal axis may occur before or after the perpendicular cutting operation.

Figure 8:
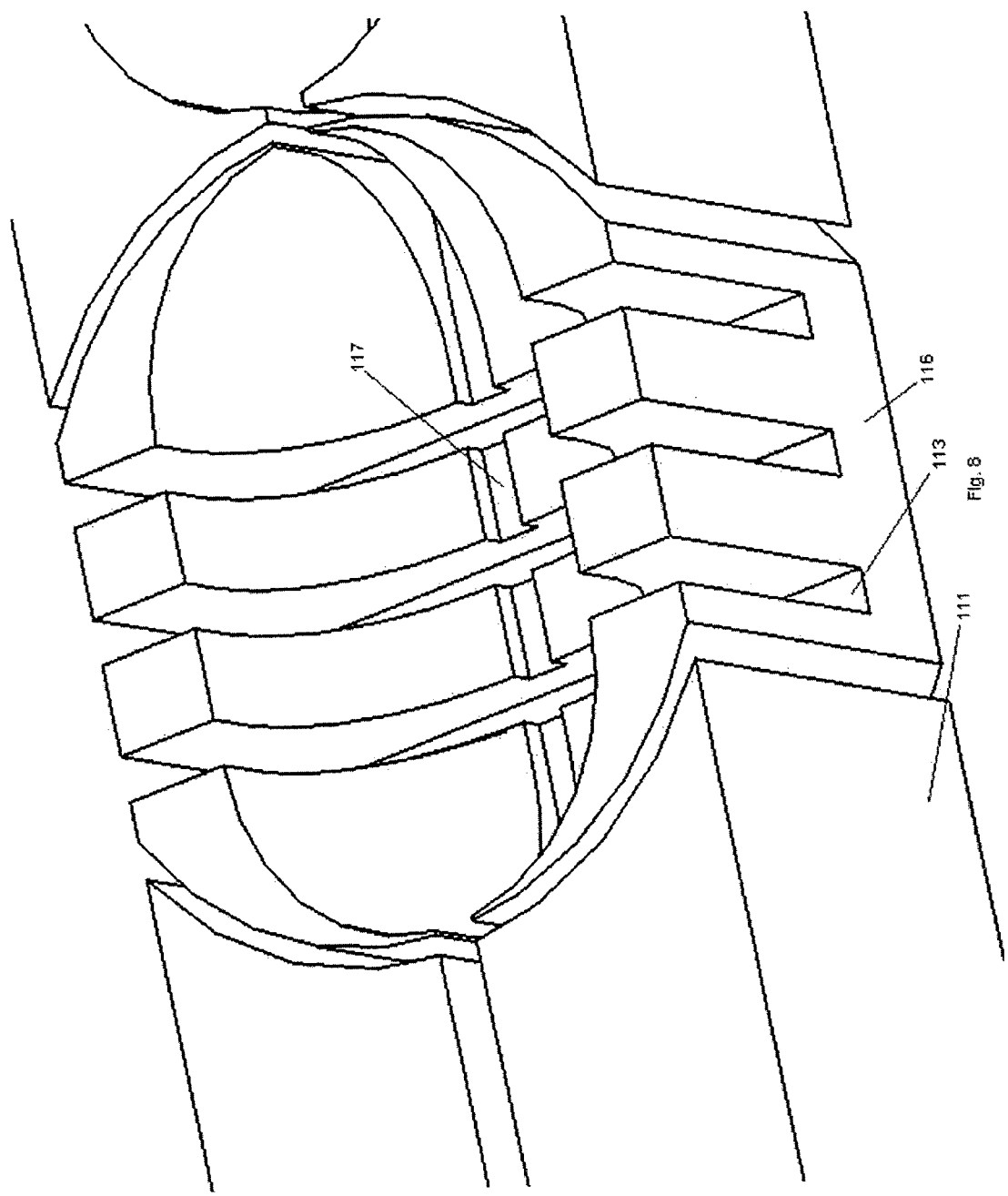
FIG. 8 depicts a partial view of an example embodiment of a tablet tray mold with rotatable mold cavities.

FIG. 8 depicts an example embodiment of a tablet retention mold 111 with a rotatable cavity 116. During a first pass of the mold 111 through the tablet dividing device, using a first spindle having a first configuration of blades (e.g., three blades per gang), the tablets may be divided into a first plurality of tablet portions (e.g., along the grooves 113 that are perpendicular to the longitudinal axis of the mold 111). The cavities 116 may then be rotated such that, during a second pass of the mold through the tablet dividing device, using a second spindle having a second configuration of blades (e.g., one blade per gang), the tablet portions may be divided into smaller tablet portions (e.g., along the longitudinal groove 117). The different spindles could be manually changed into and out of the dividing mechanism, or automatically changed in and out under direction from the controller.

A method according to the invention for packaging medications includes dividing each of a plurality of medicinal tablets into a respective plurality of tablet portions. The tablet portions may be separated to form first and second pluralities of tablet portions, where each of the first plurality of tablet portions has a first shape and each of the second plurality of tablet portions has a second shape that is different from the first shape.

For example, consider the divided tablet depicted in FIG. 4. Tablet portions 101 and 102 have the same shape. Tablet portions 103 and 104 have the same shape. Tablet portions 101 and 102 have a different shape from that of tablet portions 103 and 104. Accordingly, it would be desirable to package a first plurality of tablet portions having the shape of tablet portions 101 and 102 in a first package, and to package a second plurality of tablet portions having the shape of tablet portions 103 and 104 in a second package. In this way, like-shaped tablet portions may be packaged together so that all the tablet portions in a package look the same to the recipient. The first package may be distributed to a first recipient and the second package may be distributed to second recipient. In this way, each recipient receives a package of tablet portions that look the same and have the same dosage.

Depending on the shape of the tablet and, more precisely, on the number of different tablet portion shapes that result from dividing the tablet, a third plurality of tablet portions may be separated out and packaged as a third package. Each of the third plurality of tablet portions may have a shape that is the same as every other tablet portion in the third plurality, and different from the first shape and the second shape. The third plurality of tablet portions may be distributed to a third recipient.

According to an aspect of the invention, a tablet or tablet portion may be partially divided into two or more tablet portions that remain attached to one another. Such a partially-divided tablet or tablet portion may be desirable where a consumer of the medication may wish to complete the division process the partially-divided tablet or tablet portion into discrete tablet portions.

For example, consider the tablet depicted in FIG. 4. Rather than completely dividing the tablet into separate tablet portions, the tablet may be partially divided along one or more of the cuts so that two or more of the tablet portions remain attached to one another. For example, the tablet may be divided by passing the tablet through a gang of two blades disposed to separate tablet portions 103 and 104 from the remainder of the tablet. Then, the remaining tablet portion may then be passed partially through a single blade so that the remaining tablet portion is partially divided such that tablet portions 101 and 102 remain attached to one another.

A tablet or tablet portion may be partially divided according to a process such as the following. A tablet, for example, may be passed through one or more blades until the tablet is cut, say, about 45% through. The tablet may then be rotated by 180° about the longitudinal axis of the mold, and passed through the blades again until the tablet is cut another, say, 45%. Thus, the tablet may be cut 90% through, with the tablet portions remaining attached to one another.

To ensure that the tablet portions are of satisfactory quality, certain quality control measures may be employed. First, regular visual inspections may be performed to determine whether the surfaces and edges of the tablet portions are as smooth and uniform as they should be. Also, visual inspections may be performed to determine whether any impurities are present. One or more randomly selected tablet portions may be weighed to verify that the tablet portions are of the expected weight and, therefore, of the expected dosage. Similarly, one or more randomly selected tablet portions may be measured with a digital caliper to verify that the tablet portions are of the expected size and shape. The weight, size, and shape measurements may be compared against respective predefined values associated with the tablet being divided. Weighing a plurality of tablet portions also provides an indication of how much material is being lost during the dividing operation. This may be desirable for determining the dosage of the resultant tablet portions. For example, because of losses resultant from the dividing process, an 80 mg tablet might not be divisible into eight, 10-mg tablet portions.

To prevent cross-contamination of one medication by particulates of another, a different blade spindle may be provided for each different medication to be divided. To verify that the dosages of the tablet portions will hold up during shipment and handling, tablet portions may be tumbled for a period of time, and then retested to verify that no more than an acceptable amount of the tablet has been lost.

An example test to ensure uniformity of split tablets may be based on the United States Pharmocopeia (USP) Uniformity of Dosage Units Test, which requires that the relative standard deviation (RSD) of the weight of a selection of whole tablets have a minimal amount of deviation from the mean weight of the tablets, and that no individual tablet be far off the mean. The uniformity test may be passed if a random selection of 10 tablets (from an original random sample of 30 or more tablets) has an RSD of no more than 6% from the mean weight of the tablets selected, at least 9 weigh within 15% of the mean weight, and none deviate by more than 25% from the mean weight. If the sample of 10 dosage units fails the test, an additional 20 are selected. The sample can still pass if all 30 tablets have an RSD of no more than 7.8% of the mean weight of all tablets, not more than 3 dosage units deviate from the mean weight by more than 15%, and none deviate from the mean weight by more than 25%. This test is based on whole tablet uniformity, there does not exist a standard for tablet fragments.

According to an aspect of the invention, an adaptation of this test may be applied to ensure tablet fragment uniformity. In such an adaptation, the RSD of the tablet portion weights may be determined using a predefined reference weight. The reference weight may be an absolute weight. For example, theoretically (i.e., if there were no loss), an 80-mg tablet could be divided into four, 20-mg tablet portions or fragments. In such an example, 20 mg could be the reference weight. Alternatively, the reference weight could be the mean weight of the tablet portions. It should be understood that the reference weight could be any desired weight for the tablet portions.

The plurality of tablet portions may be said to pass the integrity test if the relative standard deviation is no more than 6% from the reference weight, at least 90% of the tablet portions weigh within 15% of the reference weight, and none of the tablet portions deviates by more than 25% from the reference weight. The inventors have discovered that a tablet splitting device according to the invention may produce tablet portions within an RSD of 6%.

If, however, the plurality of tablet portions fails the integrity test, then a second plurality of medicinal tablets may be divided into respective second pluralities of tablet portions. A second relative standard deviation from the reference weight may be computed for the second plurality of tablet portions. The integrity test is passed if the second relative standard deviation is no more than 7.8% from the reference weight, at least 85% of the tablet portions weigh within 15% of the reference weight, and none of the tablet portions deviates by more than 25% from the reference weight.

Another test that can be applied is the USP compounding standards test. This test ensures accuracy in a compound, e.g., that the dosage unit is within 10% of its theoretical weight. The inventors have discovered that tablet portions produced by apparatus according to the invention conform to this standard even with multiple divisions.

Thus, there have been described apparatus and methods for dividing medicinal tablets and methods for packaging and distributing the resultant tablet portions. It will be appreciated that numerous modifications may be made to the example embodiments described herein, and that such modifications do not depart from the scope of the invention as defined by the following claims.

What is claimed:

1. Apparatus in combination with oral solid medicinal tablets, for dividing the tablets, said apparatus comprising:
    a plurality of gangs of rotary saw blades disposed along a common axis;
    a tablet retention mechanism that contains a plurality of oral solid medicinal tablets, each of said medicinal tablets having a shape, the tablet retention mechanism comprising a tablet tray that defines a linear array of cavities, each said cavity having a shape that corresponds to the shape of the medicinal tablets and containing a respective one of the plurality of medicinal tablets; and
    a controller that causes the tablet retention mechanism to move relative to the rotary saw blades such that each of the plurality of tablets is divided by a respective gang of tablet dividing members into a respective number of tablet portions,
    wherein the rotary saw blades within each gang are disposed relative to one another along the common axis to divide the tablets into a first tablet portion having a first shape and a first volume, and a second tablet portion having a second shape and a second volume, the first shape being different from the second shape, the first volume being equal to the second volume,
    wherein the tablet tray further defines a respective plurality of grooves within each cavity, each said groove extending through the tablet tray from first to second opposing sides of the tray, the grooves being positioned within each cavity such that the grooves within each cavity define the shapes and volumes of the tablet portions, wherein each groove is disposed to allow a respective one of the rotary saw blades to move through the tablet tray when the plurality of tablets is divided,
    wherein the tablet retention mechanism contains the plurality of medicinal tablets in a first direction, a second direction opposite the first direction, a third direction perpendicular to the first direction a fourth direction opposite the third direction, a fifth direction perpendicular to the first direction, and a sixth direction opposite the fifth direction.

2. Apparatus according to claim 1, wherein the dividing members are ganged to divide each of the medicinal tablets into a respective plurality of three or more tablet portions.

3. Apparatus according to claim 2, wherein the dividing members are disposed along the common axis as ten gangs of three dividing members each.

* * * * *